United States Patent
Williams et al.

(10) Patent No.: US 6,906,619 B2
(45) Date of Patent: Jun. 14, 2005

(54) VISUAL ATTENTION INFLUENCED CONDITION INDICIA APPARATUS AND METHOD

(75) Inventors: Marc Williams, Algonquin, IL (US); Joshua Hurwitz, Niles, IL (US); David Wheatley, North Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 41 days.

(21) Appl. No.: 10/375,569

(22) Filed: Feb. 27, 2003

(65) Prior Publication Data

US 2004/0178890 A1 Sep. 16, 2004

(51) Int. Cl.⁷ .............................................. B60Q 1/00
(52) U.S. Cl. .................... 340/425.5; 340/436; 340/439; 701/301
(58) Field of Search ............................. 340/425.5, 435, 340/436, 438, 439, 440, 691.6, 692; 701/301

(56) References Cited

U.S. PATENT DOCUMENTS

| | | | |
|---|---|---|---|
| 5,357,438 A | | 10/1994 | Davidian |
| 5,521,580 A | * | 5/1996 | Kaneko et al. ............. 340/439 |
| 5,801,667 A | * | 9/1998 | Shimizu et al. ................ 345/7 |
| 5,969,969 A | | 10/1999 | Ejiri et al. |
| 5,978,737 A | * | 11/1999 | Pawlowski et al. ......... 701/301 |
| 5,979,586 A | * | 11/1999 | Farmer et al. .............. 180/274 |
| 6,014,601 A | | 1/2000 | Gustafson |
| 6,060,989 A | | 5/2000 | Gehlot |
| 6,091,323 A | * | 7/2000 | Kawai ......................... 340/435 |
| 6,184,791 B1 | | 2/2001 | Baugh |
| 6,218,961 B1 | | 4/2001 | Gross et al. |
| 6,380,884 B1 | | 4/2002 | Satou et al. |
| 6,392,550 B1 | | 5/2002 | Najor |
| 6,559,761 B1 | * | 5/2003 | Miller et al. ................ 340/435 |

OTHER PUBLICATIONS

Miura, Toshiaki, *Active Function of Eye Movement and Useful Field of View in a Realistic Setting*, pp. 119–127; *Eye to Mind: Information Acquisiiton in Perception, Search and Reading*, 1990.

Harbluk J. and Noy Y.I., "The Impact of Cognitive Distraction on Driver Visual Behavior and Vehicle Control" Transport Canada Report #TP 13889E, Feb. 2002, 29 pages.

\* cited by examiner

*Primary Examiner*—Toan N. Pham

(57) ABSTRACT

A vehicle (30), such as an automobile, has an indicia controller (31) that can determine, via one or more direction-of-visual-attention sensors (32) a likely direction of visual attention for a given occupant of the vehicle such as, for example, the driver or another passenger. When a predetermined condition is sensed by one or more condition sensors (34, 35) (such as, for example, a predetermined hazard or other unsafe operating condition), the indicia controller can determine whether the monitored person is likely looking in a direction that likely includes the condition of concern. A particular condition indicia (36) as corresponds to the detected condition can then be provided as a function, at least in part, of whether the driver or other monitored person is already likely looking at, and is hence aware of, the detecting condition.

23 Claims, 2 Drawing Sheets

VISUAL ATTENTION INFLUENCED CONDITION INDICIA APPARATUS AND METHOD

TECHNICAL FIELD

This invention relates generally to vehicles and more particularly to the provision of indicia regarding potentially hazardous conditions to the driver of a vehicle.

BACKGROUND

Various distractions can divert the attention of a driver of a vehicle. Such distractions can be sourced from within a vehicle or from without and may last over a widely varying length of time. When such a distraction diverts a driver's attention at the same time as when a hazardous condition arises, accidents can result.

Various warning systems are known, and others are being developed, to alert a vehicle driver to the existence of potential hazards in the driving environment. For example, in-vehicle radar systems can detect and warn when a collision appears possible or likely. Image processing systems can detect and warn when a traffic signal has changed to a red color. Wireless warning beacons can provide a wireless signal indicating proximity of a given roadside hazard. In each of these examples, indicia in various forms are typically provided to the driver to warn of the corresponding condition.

Unfortunately, such indicia typically represent a variety of compromises. The degree of attention by which the indicia draw attention to themselves can be inappropriate to a given set of circumstances and variables. For example, under some circumstances, the indicia can be redundant to information of which the driver is already aware. When this happens, the indicia can be an annoyance to the driver and, worse, can be a diversion that may itself distract the driver from dealing with the circumstance at hand. Under other circumstances, such as when the driver is already operating under a considerable cognitive load (as can occur when the driver is significantly distracted by some other condition), the indicia may be ineffective to break the driver's distraction in sufficient time to permit appropriate preemptive actions to be taken or to otherwise deal with the hazardous condition.

BRIEF DESCRIPTION OF THE DRAWINGS

The above needs are at least partially met through provision of the visual attention influenced condition indicia apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, the likely direction of visual attention of a predetermined person, such as, for example, a driver or passenger of a vehicle, is ascertained. Upon detecting a predetermined condition regarding the vehicle, a determination is made regarding indicia to be provided to an operator of the vehicle. This determination is made, at least in part, as a function of the likely direction of visual attention of the monitored person. So configured, for example, when an in-vehicle sensor detects that the vehicle is approaching an object, a determination can be made to not present any indicia regarding such condition upon determining that the driver's visual attention is already consistent with the location of the condition. On the other hand, if the in-vehicle sensor detects that the vehicle is approaching an object while the driver's visual attention is significantly diverted away from the locus of the sensed condition, appropriate indicia can then be provided. Depending upon the embodiment, a plurality of candidate indicia can be provided, with a subset of indicia being selected as a function of the driver's likely direction of visual attention, the potential severity of the sensed condition, and so forth.

Such an approach can be used with a wide variety of both in-vehicle sensors (including both sensors that detect conditions regarding the vehicle itself and sensors that detect conditions external to the vehicle) and external information sources, either alone or in combination with one another.

So configured, indicia regarding sensed conditions can be selected and/or modified to more likely assist the driver in a meaningful way. Annoying, distracting and/or nuisance alarms can be substantially reduced or eliminated. (For clarification, a nuisance alarm occurs when a driver is paying attention to a condition, but is presented with an alarm that is designed to attract his attention to that condition.) At the same time, the driver's attention can likely be regained during genuinely hazardous conditions through use of indicia that are likely to successfully regain and redirect the attention of the driver. Such compelling indicia, while inappropriate for use with every instance of occurrence of a given condition, can be usefully held in reserve for use during times when the driver's attention is urgently required.

Figure 1:
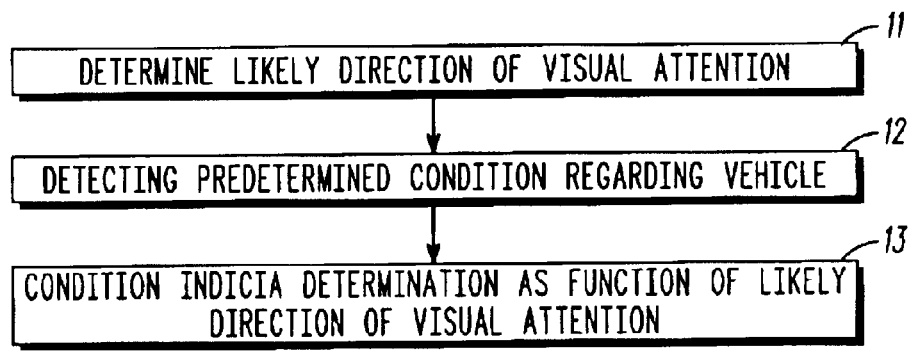
FIG. 1 comprises a flow diagram as configured in accordance with an embodiment of the invention.

Referring now to the drawings, and in particular to FIG. 1, from time to time (and preferably on a relatively frequent basis), one determines 11 the likely direction of visual attention for a given individual or group of individuals (such as, for example, particular occupants of a vehicle such as the driver of the vehicle and/or a person serving as a co-pilot or navigator in that vehicle). In general, in a preferred approach, this determination provides information regarding a likely substantially current direction of visual attention of the predetermined person. Current information regarding the status of the person's gaze is preferred to ensure relevant and appropriate use of this information.

One then monitors (again on a relatively frequent basis) for one or more predetermined conditions regarding the vehicle to thereby permit detection 12 of the predetermined condition when it occurs. Such monitoring can be achieved with any or all in-vehicle sensors, non-vehicle external sensors, and/or external information sources. The predetermined condition can relate to a specific condition regarding or internal to the vehicle itself and/or to a specific condition that is external to the vehicle. In a preferred embodiment, a wide variety of both internal and external conditions are monitored on a relatively continuous basis. To illustrate, some of the conditions that can be so monitored include (but are not limited to) impending collisions, unexpected lane changes, other vehicles on a potentially converging trajectory, road surface conditions, temperature, out-of-specification engine operating performance, and inappropriate speed or braking, to name a few.

When one detects 12 a given predetermined condition regarding the vehicle, a determination 13 is then made regarding a condition indicia to provide to, for example, the driver of the vehicle. In a preferred embodiment, this determination 13 is made as a function, at least in part, of the likely direction of the monitored person's visual attention. In a preferred embodiment, a plurality of candidate condition indicia is available wherein each of the candidate indicia corresponds to the particular detected predetermined condition. Some of these candidates can be relatively unassuming (and hence less likely to distract a driver who is otherwise aware of the condition and likely dealing with the condition in an informed fashion) while others can be relatively compelling (and hence more likely to draw the attention of a distracted driver who is not yet aware of the detected condition). Such indicia can utilize (either singly or in combination) visual, audible, and/or haptic mechanisms in varying degrees of application to differentiate one candidate from another. In addition, or instead, such candidate indicia can also differ from one another with respect to the substantive informational content provided. In a preferred embodiment, these candidates also include the option of not providing any indicia whatsoever in response to detecting a particular predetermined condition. The latter may be particularly appropriate when the predetermined condition does not comprise a significant or immediate risk to life or property and where the driver in any event appears to be aware of the condition as otherwise evidenced by the direction of the driver's gaze.

When making a condition indicia determination 13 as suggested above, in one embodiment, one can make a first determination as to when the likely direction of visual attention of the predetermined person at least substantially accords with a first evaluation criteria (such as, for example, when the likely field of view of the predetermined person likely includes at least a portion of the predetermined condition). To illustrate, relatively unassuming condition indicia or no indicia at all can be provided to the driver under such circumstances. When, however, the likely direction of visual attention of the predetermined person does not substantially accord with such a first evaluation criteria, a second, different determination can be made instead. For example, more compelling indicia can be used when the predetermined condition represents a significant and imminent risk to life or property and the driver's direction of gaze does not likely include the predetermined condition.

If desired, past history regarding the monitored individual's likely direction of visual attention can be stored and utilized when making the above determinations. By noting the location of the driver's gaze over a relatively recent period of time (such as, for example, one or two seconds), one can determine when the driver's gaze is moving and in which direction the gaze is moving. To illustrate, a driver may have been looking at their driver's side door mirror and is now in the process of returning their gaze to a forward direction. By noting a series of such determinations of the person's direction of gaze over a recent period of time, one can determine that, although the person is not presently likely looking at the predetermined condition of concern, the person is nevertheless likely to be looking in the correct direction in the immediate future. (Immediate future being a timeframe consistent with the timely redirection of the driver's attention to the potential condition or hazard.)

Figure 2:
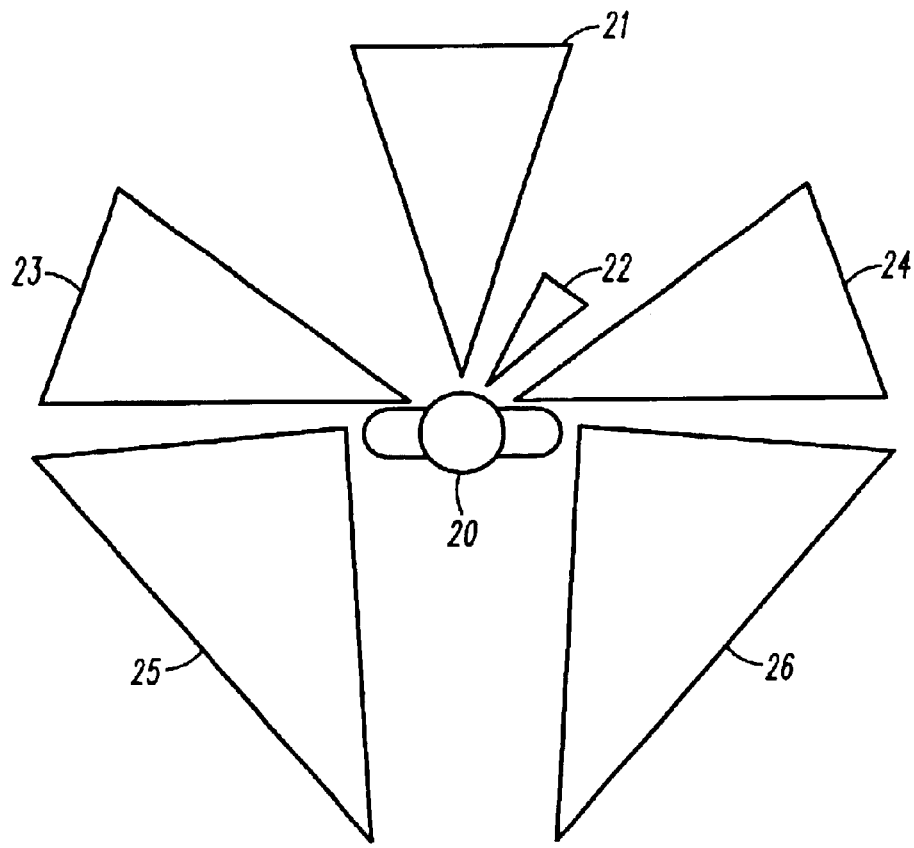
FIG. 2 comprises a top plan schematic view of a vehicle driver and various exemplary gaze-directions of potential interest in accordance with an embodiment of the invention.

The monitored direction of gaze can be parsed as generally, or finely, as may be appropriate to a given application. Pursuant to one embodiment, a driver's direction of visual attention can be generally subdivided into six specific fields of view. With reference to FIG. 2, these six views for a given driver 20 include a forward view 21, a rear-view mirror view 22, a driver-side view 23, a passenger-side view 24, a driver-side rear view 25, and a passenger-side rear view 26. So configured, the more common and primary directions of a driver's gaze are generally segregated from one another to thereby permit the kinds of determinations as are suggested above.

Other configurations and parsing selections are of course possible. For example, side views can be combined to comprise a single field of view. Or, if desired, the suggested views can be subdivided further and/or other views can be added (such as a view to capture and represent when a driver is gazing downwardly at, for example, internal controls and/or displays). One simple embodiment would simply monitor for when the driver's gaze is forwardly directed, with any other condition being simply treated as being "non-forward."

Figure 3:
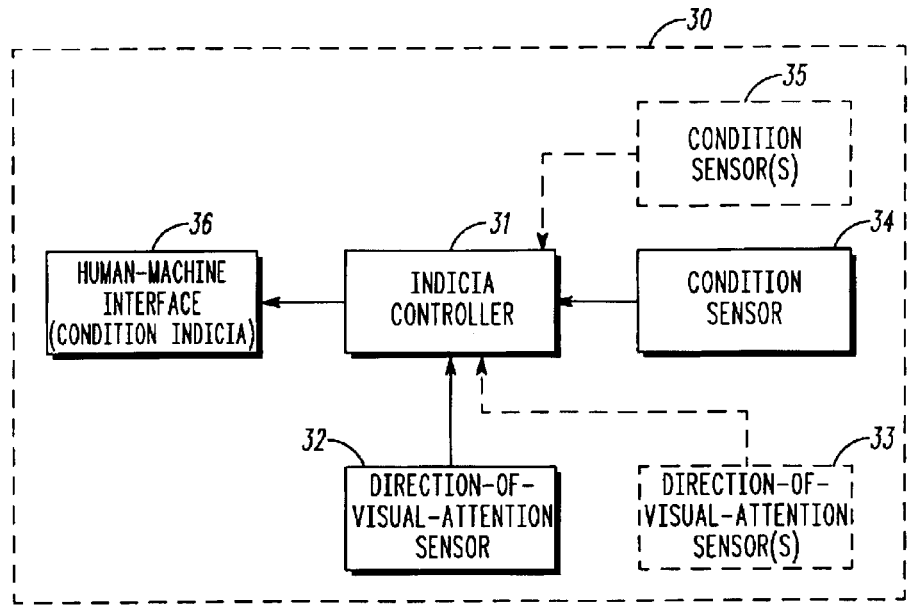
FIG. 3 comprises a block diagram as configured in accordance with an embodiment of the invention.

The above-described processes can be carried out in a variety of ways. Referring now to FIG. 3, one particular approach for use in a given vehicle 30, such as a terrestrial vehicle like an automobile, an indicia controller 31 can be comprised of a processing platform such as a microprocessor. Such a processing platform can of course comprise a single integrated entity or can be configured as a distributed processing platform as well understood in the art. In addition, the indicia controller 31 can comprise a dedicated platform that serves only the processes described herein or that shares its computational capacity with other functions and processes as well (such as, for example, engine control, navigation, and the like). In general, the indicia controller 31 serves to provide a platform for supporting the above-described determination of when a predetermined person is likely paying visual attention to one or more predetermined vehicle conditions (and/or, as suggested earlier, is likely, in the immediate or near future, to pay visual attention to the predetermined vehicle condition).

At least one direction-of-visual-attention sensor 32 operably couples to the indicia controller 31. In a preferred embodiment, at least one other such sensor 33 (and preferably more) also operably couples to the indicia controller 31. The number of such sensors required for a given application will depend upon a variety of circumstances and design requirements, including but not limited to the number and size of desired fields of view, the number of persons to be monitored, and the particular enabling technology utilized. A variety of such sensors are known in the art. Various eye-trackers (including, for example, retinal tracking) as are now known or that are developed hereafter are all suitable candidates to consider for use, with any particular eye-tracking technology being selected as a function of desired performance, anticipated operating conditions and environment, accuracy, sampling rate, desired cost and/or form factor requirements, and so forth. Given that such devices are already well known and understood in the art, further description will not be provided here for the sake of brevity and the preservation of focus.

The indicia controller 31 also operably couples to one or more condition sensors 34, 35. As already noted above, such sensors can monitor for various desired and predetermined conditions that include both the vehicle itself and the environment within which the vehicle operates. A wide variety of such sensors are presently known and/or are the subject of present development and commercialization efforts, including but not limited to:

vehicle speed sensor;
vehicle heading sensor;
vehicle location sensor;
vehicle acceleration sensor;
turn signal status sensor;
headlight status sensor;
cruise control status sensor;
seat occupancy status sensor;
radar-based sensor;
lidar-based sensor;
horn status sensor;
brake status sensor;
external temperature sensor;
image processor.

In a preferred embodiment, at least one of the condition sensors can comprise a wireless communication platform that communicates, for example, with a roadside information service such as the Dedicated Short Range Communications (DSRC) service currently being discussed by at least one standards forming body and being currently developed in the industry. So configured, the sensor could wirelessly receive information regarding a predetermined condition (such as impending weather conditions, upcoming road hazards, and so forth) from at least one non-vehicle source. In general, any presently known or hereafter developed sensor capable of detecting and/or otherwise providing information regarding a given condition can be consistently used with the platforms and processes described herein.

Lastly, the indicia controller 31 can operably couple to one or more human-machine interfaces (HMI) 36 that serve to present the selected condition indicia. Such an HMI 36 can include one or more displays, graphic elements, lights, or the like, as well as audible information (including alarm tones as well as pre-recorded verbal instructions) and haptic sensations (such as a vibrating steering wheel, a vibrating accelerator pedal, and the like). As with condition sensors, a wide variety of HMI's presently exist with many more being designed and released on a regular basis. And again, such presently known and hereafter developed HMI's are all appropriate to consider for use, alone or in combination with other HMI platforms, in a given application of these teachings.

So configured, such an apparatus can control the HMI 36 pursuant to a first mode of operation when the direction-of-visual-attention sensor 32 indicates that the predetermined person is likely to view a given predetermined vehicle condition (which predetermined vehicle condition correlates to a particular condition indicia) and pursuant to a second mode of operation when the direction-of-view-attention sensor 32 indicates that the predetermined person is not likely to view the predetermined vehicle condition. Additional modes of operation that correspond to yet other alternatives regarding the presentation of a given condition indicia can of course be added as desired and appropriate to a given application.

Figure 4:
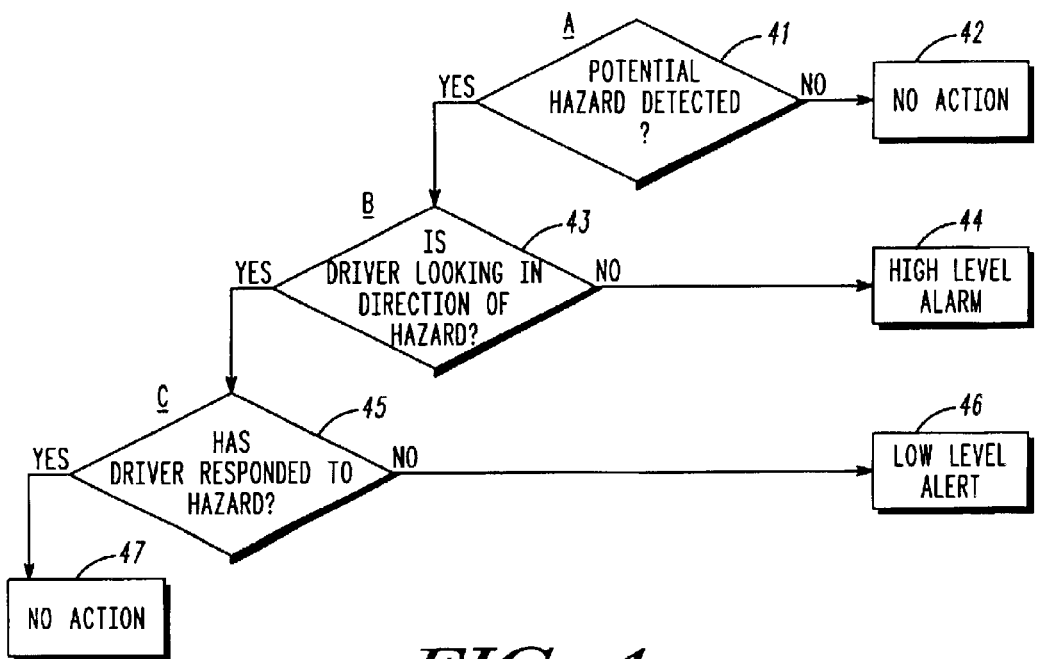
FIG. 4 comprises a flow diagram as configured in accordance with a particular embodiment of the invention.

FIG. 4 depicts one illustrative embodiment that accords with the above configurations. The system monitors as suggested above to detect potential hazards 41. When no such hazards are detected, no actions regarding the provision of cautionary indicia are instigated 42. When a potential hazard is detected 41, however, the system determines 43 whether the driver appears to be looking in the direction of the detected hazard. For example, if the hazard comprises another vehicle approaching rapidly from the passenger side of the driver's vehicle, the system determines 43 whether the driver is presently looking (or, in some embodiments, has recently looked) in the direction of the potential hazard. When this determination 43 suggests that the driver is not viewing (or, in some embodiments, will not likely view in the near future) the potential hazard, a high level alarm is provided 44. For example, a particularly compelling audible, visible, and/or haptic presentation can be provided to likely draw the attention of the driver to the presence of the potential hazard.

When this determination 43 reveals, however, that the driver is likely viewing (or, in some embodiments, will likely view in the immediate or near future) the potential hazard, the system can determine whether the driver has taken an action 45 in apparent response to the potential hazard. For example, if the potential hazard comprises a rapidly approaching obstacle towards the front of the vehicle, the system can determine whether the driver has applied the vehicle's brakes, reduced the provision of gasoline to the engine, or taken some other prophylactic action such as, for example, steering to avoid the obstacle. When such an action has been detected, the system can determine to take no particular action 47 with respect to the provision of any cautionary warnings to the driver. When, however, no such action has yet been taken, the system can provide 46 a relatively low-level alert. For example, a low-level audible alarm can be provided or a relatively less-compelling graphic indicator can be provided on a heads-up, high-heads down, or other display for the driver. This lower level of cautionary warning accords with the previously determined information that the driver is already likely aware of the potential hazard.

Some other examples consistent with these embodiments now follow.

EXAMPLE 1

The driver of the vehicle activates his or her driver-side turn signal while the vehicle is in motion. On-board sensors detect the presence of another vehicle on that side of the driver's vehicle. A determination is made as to whether the driver is likely aware of the other vehicle by ascertaining whether the driver is presently looking in a direction that would likely encompass the other vehicle (or, in some embodiments, whether the driver will likely look in that direction within some reasonably relevant period of time). When not true, a compelling alert can be provided to the driver to alert the driver as to the presence of this other vehicle. When true, a more diminutive alert or no alert may be provided.

EXAMPLE 2

While a given driver navigates his vehicle at a substantially constant speed, an on-board sensor detects an obstacle rapidly approaching from the rear of the vehicle. A determination is made as to whether the driver is looking (or, in some embodiments, is likely to look in the near future) in his or her rear view mirror such that the presence of the rapidly approaching object is likely known to the driver. When not true, a compelling alert indicia can again be provided to the driver regarding this sensed condition. When true, however, and when the system can sense that an appropriate response has not yet been made (such as accelerating, steering so as to avoid the approaching object, or such other action as may be appropriate to monitor) a relatively diminutive cautionary indicia regarding this condition can be provided, or no alert may be provided.

So configured, it can be readily appreciated that the various embodiments described above all provide a significant and effective mechanism for facilitating effective use of the ever-increasing number of condition monitors, sensors, and other information sources as are available or will soon be generally available on modern vehicles while substantially avoiding the provision of likely redundant and/or annoying information to a driver. Cautionary and/or instructional indicia that correspond to a given vehicle condition regarding the vehicle and/or external influences likely to impact the vehicle can be provided in a metered fashion that accords with the likelihood that the driver is, or is not, already likely aware of the given condition.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   in a vehicle:
   determining at least a recent history of a plurality of likely directions of visual attention of a predetermined person;
   determining a likely present direction of visual attention of the predetermined person;
   detecting a predetermined condition regarding the vehicle;
   making a determination regarding an indicia to provide to an operator of the vehicle regarding the predetermined condition as a function, at least in part, of the recent history and the likely present direction of visual attention of the predetermined person.

2. The method of claim 1 wherein determining a likely direction of visual attention of a predetermined person includes determining a likely direction of visual attention of an occupant of the vehicle.

3. The method of claim 2 wherein determining a likely direction of visual attention of an occupant of the vehicle includes determining a likely direction of visual attention of the operator of the vehicle.

4. The method of claim 1 wherein determining a likely direction of visual attention of a predetermined person includes using an eye tracker to determine a likely direction of visual attention of a predetermined person.

5. The method of claim 1 wherein determining a likely direction of visual attention of a predetermined person includes determining a likely substantially current direction of visual attention of a predetermined person.

6. The method of claim 1 wherein detecting a predetermined condition regarding the vehicle includes receiving information from at least one in-vehicle sensor regarding a predetermined condition regarding the vehicle.

7. The method of claim 6 wherein receiving information from at least one in-vehicle sensor regarding a predetermined condition regarding the vehicle includes receiving information from at least one in-vehicle sensor comprising at least one of:

vehicle speed sensor;
vehicle heading sensor;
vehicle location sensor;
vehicle acceleration sensor;
turn signal status sensor;
headlight status sensor;
cruise control status sensor;
seat occupancy status sensor;
radar-based sensor;
lidar-based sensor;
horn status sensor;
brake status sensor;
external temperature sensor;
image processor.

8. The method of claim 1 wherein making a determination regarding an indicia to provide to an operator of the vehicle regarding the predetermined condition as a function, at least in part, of the likely direction of visual attention of the predetermined person includes determining whether to provide the indicia.

9. The method of claim 1 wherein making a determination regarding an indicia to provide to an operator of the vehicle regarding the predetermined condition as a function, at least in part, of the likely direction of visual attention of the predetermined person includes making the determination as a function, at least in part, of a likely future direction of visual attention of the predetermined person.

10. The method of claim 1 wherein detecting a predetermined condition regarding the vehicle includes detecting a predetermined condition that is external to the vehicle.

11. The method of claim 1 wherein detecting a predetermined condition regarding the vehicle includes detecting a predetermined condition that is internal to the vehicle.

12. A method comprising:
    in a vehicle:
    determining a likely direction of visual attention of a predetermined person;
    detecting a predetermined condition regarding the vehicle, at least in part, by receiving information from at least one non-vehicle source via a wireless communication link;
    making a determination regarding an indicia to provide to an operator of the vehicle regarding the predetermined condition as a function, at least in part, of the likely direction of visual attention of the predetermined.

13. A method comprising:
    in a vehicle:
    determining a likely direction of visual attention of a predetermined person;
    detecting a predetermined condition regarding the vehicle;
    making a determination regarding an indicia to provide to an operator of the vehicle regarding the predetermined condition as a function, at least in part, of the likely direction of visual attention of the predetermined person and by determining which indicia to provide from amongst a plurality of candidate indicia that each relate to the predetermined function.

14. The method of claim 13 wherein making a determination regarding an indicia to provide to an operator of the vehicle regarding the predetermined condition as a function, at least in part, of the likely direction of visual attention of the predetermined person includes:

making a first determination when the likely direction of visual attention of the predetermined person at least substantially accords with a first evaluation criteria; and making a second determination, which second determination is different from the first determination, when the likely direction of visual attention of the predetermined person does not at least substantially accord with the first evaluation criteria.

15. The method of claim 14 wherein the first evaluation criteria includes a likely direction of visual attention of the predetermined person that at least substantially coincides with a field of view that includes at least a portion of the predetermined condition.

16. An apparatus comprising:
a direction-of-visual-attention sensor disposed operationally proximal to a predetermined person;
at least one condition sensor;
a condition indicia;
an indicia controller having inputs operably coupled to the direction-of-visual-attention sensor and the condition sensor and having an output operably coupled to the condition indicia, wherein:
the indicia controller controls the condition indicia pursuant to a first mode of operation when the direction-of-visual-attention sensor indicates that the predetermined person is likely to view a predetermined vehicle condition, which predetermined vehicle condition correlates to the condition indicia; and
the indicia controller controls the condition indicia pursuant to a second mode of operation when the direction-of-view-attention sensor indicates that the predetermined person is not likely to view the predetermined vehicle condition.

17. The apparatus of claim 16 wherein the direction-of-visual-attention sensor comprises means for detecting a direction of visual attention of the predetermined person.

18. The apparatus of claim 17 wherein the means for detecting a direction of visual attention of the predetermined person comprises an eye tracker.

19. The apparatus of claim 16 wherein the at least one condition sensor includes at least one of a:
vehicle speed sensor;
vehicle heading sensor;
vehicle location sensor;
vehicle acceleration sensor;
turn signal status sensor;
headlight status sensor;
cruise control status sensor;
seat occupancy status sensor;
radar-based sensor;
lidar-based sensor;
horn status sensor;
brake status sensor;
external temperature sensor;
image processor.

20. The apparatus of claim 16 wherein the indicia controller comprises processing means for determining when the predetermined person is likely paying visual attention to the predetermined vehicle condition.

21. The apparatus of claim 20 wherein the processing means for determining when the predetermined person is likely paying visual attention to the predetermined vehicle condition includes means for determining that the predetermined person is likely, in the near future, to pay visual attention to the predetermined vehicle condition.

22. The apparatus of claim 16 wherein the apparatus comprises a vehicle.

23. The apparatus of claim 22 wherein the vehicle comprises a terrestrial vehicle.

* * * * *